United States Patent [19]
Nutter

[11] 3,747,905
[45] July 24, 1973

[54] CONTACT APPARATUS AND METHOD

[75] Inventor: Dale E. Nutter, Tulsa, Okla.

[73] Assignee: Irving E. Nutter; Martha C. Nutter; Nancy N. Pantaleoni, all of Tulsa, Okla.; a part interest to each

[22] Filed: Nov. 10, 1970

[21] Appl. No.: 88,395

[52] U.S. Cl. .................. 261/114 R, 261/114 JP
[51] Int. Cl. ............................................ B01d 3/16
[58] Field of Search .................. 261/114 R, 114 A, 261/114 VT, 114 JP; 202/158

[56] References Cited
UNITED STATES PATENTS

| | | | |
|---|---|---|---|
| 1,748,409 | 2/1930 | Campbell | 202/158 |
| 2,973,189 | 2/1961 | Chu | 261/114 R |
| 2,787,453 | 4/1957 | Hibshman et al. | 261/114 R |
| 3,362,696 | 1/1968 | Vanghan | 261/114 R |

FOREIGN PATENTS OR APPLICATIONS

| | | | |
|---|---|---|---|
| 901,917 | 4/1945 | France | 202/158 |
| 839,694 | 4/1939 | France | 261/114 R |
| 945,844 | 1/1964 | Great Britain | 261/114 R |

OTHER PUBLICATIONS
Koppers, German printed application 1052379.

Primary Examiner—Tim R. Miles
Assistant Examiner—Steven H. Markowitz
Attorney—Beveridge & De Grandi

[57] ABSTRACT

Improved liquid flow patterns across a cross-flow bubble tray of circular plan form are achieved by introducing the ascending gases to the liquid in a direction which is exclusively lateral to the liquid flow direction, and introducing liquid at the upstream end of the tray through a downcomer escape opening which has its vertical dimensions increasing from a minimum at the center of the downcomer to a maximum at the edges of the downcomer.

15 Claims, 4 Drawing Figures

INVENTOR
DALE E. NUTTER

BY Beveridge & De Grandi

ATTORNEYS

PATENTED JUL 24 1973

INVENTOR
DALE E. NUTTER

BY Beveridge & De Grandi

ATTORNEYS

CONTACT APPARATUS AND METHOD

This invention relates to bubble tray fluid contact apparatus. "Bubble tray" is a generic term used to describe apparatus wherein a body of liquid flows across an apertured surface while gas is introduced through the tray apertures so that it passes upwardly through the flowing body of liquid. The terms "liquid" and "gas" are used to describe the fluids flowing in their respective states. Various types of gas-introducing apertures may be used. Bubble trays may have valves which may for example be of the types shown in U.S. Pat. Nos. 2,951,691 and 3,530,879, bubble caps typified by U.S. Pat. No. 1,667,136 or slots of the type shown in U.S. Pat. No. 3,463,464 which cause the gas to enter the body of liquid in a direction orientated laterally to the liquid flow direction, or perforated metal sheets (sieve trays) which have no deflecting means.

A specific environment for this invention is in fractionation columns commonly referred to as fractionation towers used predominantly in the petroleum and chemical industries for the distillation and absorption of hydrocarbon and chemical materials and also for stripping gases and producing chemical reactions. Such columns contain vertically spaced, apertured trays which are orientated to support the traversing liquid. Ascending vapors are directed upwardly through apertures formed in the trays so that they will come into contact with the transcending liquid. At the discharge end of each tray it is usual practice to provide a weir over which liquid may flow into a downcomer where it will be directed to the inlet or upstream end of the next adjacent lower tray. This type of apparatus causes the liquid to follow a descending staged path crossing the vertically spaced trays while the ascending gases flow upwardly through the tray apertures.

In bubble tray apparatus, it is desirable to cause the liquid to flow across each tray in a manner which will result in segregated gas contact with each transverse elemental portion of the body of liquid. An ideal liquid flow pattern would be one which causes each transverse element of liquid to flow with a substantially uniform velocity across the apertured surface of the tray whereby all the liquid entering the tray during a given increment of time will also depart from the tray simultaneously. Experimentation performed in connection with this invention has revealed that this ideal condition is not accomplished or approached in most types of bubble tray apparatus. In most apparatus, the liquid entering along the longitudinal centerline of the tray moves more rapidly than the liquid at the sides of the tray. This effect is believed to result from several factors including the shape and dimensions of the downcomer escape area which introduces liquid to the upstream end of the tray, the absence in some apparatus of a submerged barrier bar sometimes used in conjunction with a successive adjacent row of perforated holes located in the vicinity of the downcomer escape opening, and the nature of the structure which defines gas-introducing apertures. Other parties have worked on variations in the configuration of the downcomer escape opening at about the time of my invention; however, the desirable effect resulting from the combination of a specially configured downcomer escape opening with a barrier bar with adjacent perforations and gas-introducing apertures which effect lateral gas distribution has not been dealt with and is believed to constitute an important portion of this invention.

The principal object of this invention is to provide a bubble tray apparatus which has an improved liquid flow pattern across the bubbling area of the tray. This is achieved by virtue of an improved shape for the downcomer outlet opening, the use of a submerged barrier bar with adjacent perforations in the vicinity of the downcomer outlet, the utilization of gas-introducing apertures orientated to effect the flow of ascending gases in a direction perpendicular to the liquid flow direction, and/or various combinations of these features.

For reference purposes, certain terms have been adopted in describing the apparatus. The longitudinal centerline of the tray is the imaginary reference line which extends through the center of the bubbling area of the tray directly between the center of the downcomer and the center of the discharge portion of the tray which usually constitutes an overflow weir. The expression "transverse" describes positions which are perpendicular to the longitudinal centerline and parallel to the tray. The "ends" of the tray are the areas adjacent to the downcomer escape and exit weir where liquid is introduced and discharged, and the "sides" of the tray are the areas which lie at the periphery of the tray and are spaced from the longitudinal centerline thereof.

According to one aspect of the invention which is applicable to all forms of bubble trays, a downcomer is structured to provide at the upstream end of the tray a downcomer escape area wherein protions of equal transverse dimensions increase in area according to their distance from the longitudinal centerline of the tray, in combination with a submerged barrier bar sometimes used in conjunction with an adjacent row of perforations located between the downcomer escape opening and the gas apertures in the tray.

Another aspect of the invention pertains to the combination of a tray which introduces gas into the body of liquid in a direction which is substantially exclusively perpendicular or lateral to the liquid flow direction, in combination with a downcomer which provides at the upstream end of the tray a downcomer escape opening wherein portions of equal transverse dimensions increase in area according to their distance from the longitudinal centerline of the tray.

The invention involves a method of contacting a liquid with a gas by advancing elements of liquid across a tray in a longitudinal direction with all transverse element velocity components being substantially uniform throughout each transverse band of the tray while passing gas uniformly upward through the tray and through the body of liquid.

For a more complete understanding of the principles of the invention, reference is made to the accompanying drawings which show a preferred embodiment of an apparatus using all of the inventive concepts.

Figure 1:
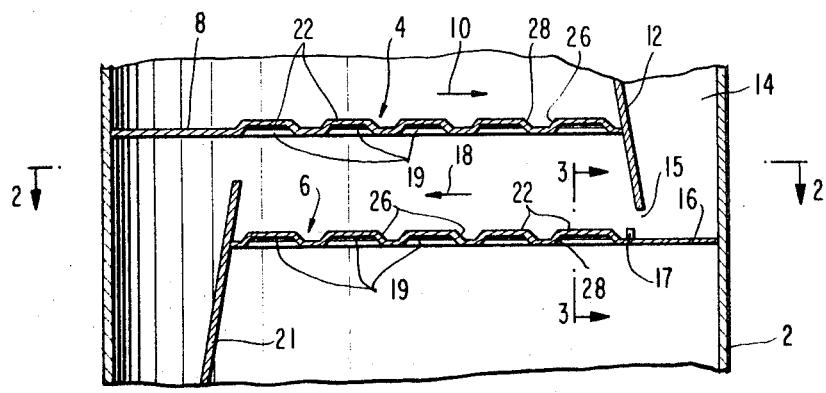
FIG. 1 is a cross sectional view through a bubble tower in a plane defined by the longitudinal centerlines of two bubble trays located therewithin.

The contact apparatus shown in the drawings is identical to that shown in U.S. Pat. No. 3,463,464 which is incorporated herein by reference. The tower or housing 2 contains a plurality of horizontal bubble trays 4 and 6 which are vertically spaced apart. The uppermost tray 4 illustrated in FIG. 1 has an upstream end 8 which receives liquid to be treated from a downcomer which is not shown. The liquid moves across the upper tray 4 in a direction indicated by the arrow 10 until it eventually passes over the overflow weir formed by the upper portion of member 12 and into the downcomer passage 14 which leads to the upstream end 16 of the lower bubble tray 6. The downcomer passage 14 is formed by the member 12 and the cylindrical tower, so that its dimensions measured parallel to the longitudinal centerline of the tray are greater at the center than at the sides. The liquid passes through the downcomer escape opening 15 which lies in a transverse vertical plane and over a barrier bar 17 and over an adjacent row of perforations 29 before continuing its movement in the direction of arrow 18 toward the overflow weir at the discharge end of the lower tray 6. The member 21 which forms the weir is similar to the member 12 and serves to provide a downcomer passage leading to the next lower tray. The upper edges of the overflow weirs are parallel to their associated trays and have a substantially uniform height along their transverse extent.

As the liquid flows over the trays in the directions represented by arrows 10 and 18, gas under pressure is passed upwardly through the tray openings 19. The ascending gas is deflected by a baffle which comprises an upstream baffle portion 26, a horizontal baffle portion 22 and a downstream baffle portion 28. This results in movement of the ascending gases in directions which lie substantially perpendicular to the direction of liquid flow across the tray. As described in the aforementioned U.S. Pat. No. 3,463,464, this also minimizes the amount of liquid which weeps downwardly through the flow openings. A similar baffling effect is provided by the valve tray shown in my U.S. Pat. No. 3,530,879 which is incorporated herein by reference.

Figure 3:
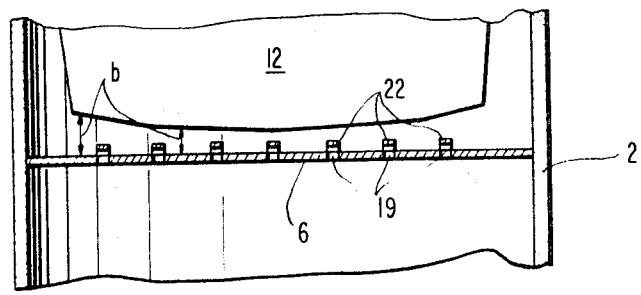
FIG. 3 is a cross sectional view taken through a vertical transverse plane identified by the reference numerals 3—3 in FIG. 1 and 2.

The utilization of the type of tray shown in these drawings has been known to minimize the potentially disruptive effects caused by the ascending gases on the body of liquid, particularly from a standpoint of preventing eddy currents and jetting of liquid in upstream or downstream directions. Although these bubble trays themselves represent a significant improvement over the prior art, they alone cannot produce a uniform liquid flow pattern throughout the tray. Experiments have been conducted using an elongated trough filled with dye which is tilted to dump a batch of dye across the transverse extent of the downcomer outlet. These experiments have shown that the dye progresses across the tray and flows over the discharge weir significantly earlier along the longitudinal centerline than at the sides of the tray, thereby forming an echelon-like flow pattern across the tray. Such a flow pattern is improved to a material extent by using a shaped downcomer tip which provides a downcomer escape opening wherein portions of equal transverse dimensions increase in area according to their distance from the longitudinal centerline of the tray. Such a configuration is illustrated in FIG. 3 where it will be seen that the distance $b$ between the downcomer tip and the tray deck increases progressively from a minimum at the longitudinal centerline of the tray to a maximum at the outer or side extremities of the downcomer. The distance $b$ for any point along the downcomer outlet opening is related to the flow path length from the downcomer escape opening to the overflow weir of the respective tray. More specifically when the character P is used to designate the flow path length, the following equation is applicable:

$$b_0/P_0^2 = b_1/P_1^2 = b_2/P_2^2 = \text{constant}$$

Figure 4:
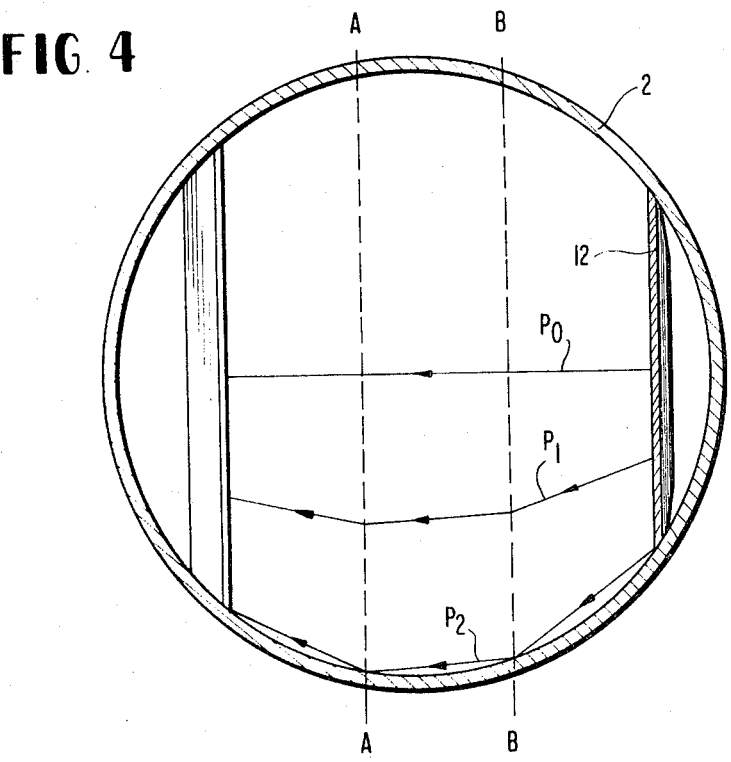
FIG. 4 is a diagrammatic drawing, similar to FIG. 2 but omitting the tray openings for the purpose of showing the manner in which approximate liquid flow path lengths may be computed.

The length of the flow path may be approximated and computed graphically by assuming that the liquid which leaves a point on the downcomer continues to lie at a constant proportional distance measured transversely of the tray. As illustrated in FIG. 4, the approximate straight line path designated $P_0$ is a single straight line from the downcomer to the overflow weir. The approximate flow path represented by the line $P_1$ is at a point 25 percent along the downcomer 15, lies at a point 25 percent along each of the transverse chords A—A and B—B throughout its movement from the downcomer outlet opening to the overflow weir. Likewise, the flow path designated $P_2$ is at the extreme side of the downcomer, extends to the extreme side of the tray at the chords A—A and B—B, and then returns to the extreme side of the overflow weir.

Figure 2:
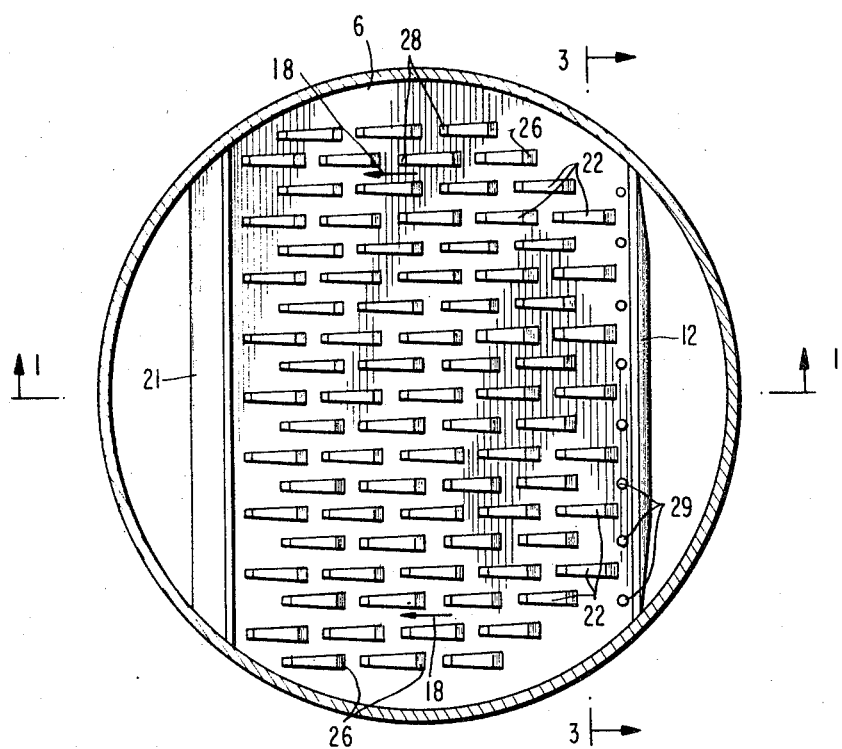
FIG. 2 is a plan view of one of the trays shown in FIG. 1, as seen along the line 2—2 of FIG. 1.

The illustrated tray also has a barrier bar designated 17 in FIG. 1 which creates an area of turbulence between the downcomer outlet opening and the tray openings. This barrier bar is lower than the downcomer tip and is preferably no higher than three-eighths inch so that it remains submerged below the liquid. The barrier bar is spaced from the downcomer escape opening 15 by a horizontal distance which is no greater than approximately the vertical dimension of the downcomer escape opening. To enhance the turbulence effects of the barrier bar, a row of perforations designated 29 in FIG. 2 may be located adjacent to the downstream side of the barrier bar.

The structure described above has been found to produce a flow pattern having a very uniform transverse band of dye which gets darker at its ends and lighter at its center as it crosses the bubbling area.

It is possible to construct an approximately shaped outlet opening experimentally without resort to mathmatical calculations. Regardless of the manner of determining the suitable outlet shape, a commercailly acceptable configuration may be made by using a plurality of straight cuts which provide a profile approximating the calculated parabolic shape. Four such cuts were used in constructing the downcomer-forming member 12 shown in FIG. 3.

Experimental dye tests have shown that the principles of the invention may be used for other types of bubble trays. In a sieve tray having eight percent of its area occupied by holes having a one-half inch diameter, it was found that the flow of liquid across the tray created an exaggerated echelon-like dye pattern, with the dye at the longitudinal centerline of the tray reaching the overflow weir when the dye at the sides of the downcomer area remained at the upstream end of the tray. Eventually, eddy currents in the dye pattern occupied the entire side areas of the tray while the center area remained clear. Improvement in the flow pattern was realized by the utilization of a downcomer tip shaped in the manner previously described. A barrier bar of the type described above was also used. However, in no event, did the flow pattern attain the highly satisfactory distribution which resulted by use of the preferred and illustrated embodiment of the invention where baffles caused the ascending gases to flow laterally with respect to the path of the liquid.

Persons familiar with the design and construction of bubble tray apparatus will readily recognize the adaptability of the principles described hereinabove to many types of apparatus typified by the general description of bubble trays in the introductory portions of this specification. Therefore, the invention is not believed to be limited only to the specific embodiments disclosed hereinabove, but is to be read in the light of the spirit of the claims which follow.

I claim:

1. Bubble tray apparatus comprising a bubble tray providing an upper surface for supporting a body of liquid and a plurality of tray apertures for introducing gases into the body of liquid,
    downcomer means located at an upstream end of the tray for carrying liquid to the tray, said downcomer means providing a downcomer outlet opening wherein portions of equal transverse dimensions increase in area according to their distance from the longitudinal centerline of the tray, and a transverse barrier bar means located where it will be submerged in an area between the downcomer outlet opening and the tray apertures.

2. Apparatus according to claim 1 wherein the value of $b/P^2$ is approximately constant throughout the downcomer outlet opening, with $b$ representing the height of points on the outlet opening and $P$ is the length of the flow path across the tray served by said points.

3. Apparatus according to claim 1 having an overflow weir at the downstream end of the tray, said overflow weir having a substantially uniform height across its entire transverse extent.

4. Apparatus according to claim 1 wherein the dimensions of the downcomer, measured parallel to the longitudinal centerline of the bubble tray, are greater at the center of the downcomer than at the sides thereof.

5. Apparatus according to claim 1 wherein the transverse dimension of the downcomer escape area is less than the maximum transverse dimension of the tray.

6. Apparatus according to claim 1 wherein baffle means are provided adjacent to the upstream and downstream ends of the apertures in the tray to prevent the movement of gases ascending through the tray aperatures in directions which lie parallel to the longitudinal centerline of the tray.

7. Apparatus according to claim 6 having additional baffle means for preventing the movement of the gases directly upwardly from the tray aperatures, whereby the gases are introduced laterally to the path of liquid on the tray.

8. Bubble tray apparatus comprising a bubble tray providing an upper surface for supporting a body of liquid and a plurality of tray apertures for introducing gases into the body of liquid, baffle means adjacent the upstream and downstream ends of the tray apertures to prevent the movement of gases in directions which lie parallel to the longitudinal centerline of the tray,
    downcomer means located at an upstream end of the tray for carrying liquid to the tray, said downcomer means providing a downcomer outlet opening wherein portions of equal transverse dimensions increase in area according to their distance from the longitudinal centerline of the tray.

9. Apparatus according to claim 8 having a transverse barrier bar located where it will be submerged in an area between the downcomer outlet opening and the tray aperatures.

10. Apparatus according to claim 8 having a transverse barrier bar with an adjacent row of perforations both located where they will be submerged in an area between the downcomer outlet opening and the tray apertures.

11. Apparatus according to calim 8 wherein the value of $b/P^2$ is approximately constant throughout the downcomer outlet opening, with $b$ representing the height of points on the outlet opening and $P$ is the length of the flow path across the tray served by said points.

12. Apparatus according to claim 8 having an overflow weir at downstream end of the tray, said overflow weir having a substantially uniform height across its entire transverse extent.

13. Apparatus according to claim 8 wherein the horizontal dimensions of the downcomer, measured parallel to the longitudinal centerline of the bubble tray, are greater at the center of the downcomer than at the sides thereof.

14. Apparatus according to claim 8 wherein the transverse dimension of the downcomer escape area is less than the maximum transverse dimension of the tray.

15. Apparatus according to claim 8 having additional baffle means for preventing the movement of the gases directly upwardly from the tray openings, whereby the gases are introduced laterally to the path of liquid on the tray.

* * * * *